United States Patent [19]

Coleman

[11] Patent Number: 5,742,424
[45] Date of Patent: *Apr. 21, 1998

[54] ELECTROCHROMIC MATERIALS AND DISPLAYS

[75] Inventor: James P. Coleman, Maryland Heights, Mo.

[73] Assignee: Monsanto Company, St. Louis, Mo.

[ * ] Notice: The term of this patent shall not extend beyond the expiration date of Pat. No. 5,500,759.

[21] Appl. No.: 778,703

[22] Filed: Jan. 3, 1997

Related U.S. Application Data

[60] Continuation of Ser. No. 435,595, May 5, 1995, abandoned, which is a division of Ser. No. 994,813, Dec. 22, 1992, Pat. No. 5,413,739.

[51] Int. Cl.$^6$ .................. G02F 1/15; B05D 5/12
[52] U.S. Cl. .............. 359/273; 359/265; 359/270; 359/275; 427/58
[58] Field of Search .................. 359/273, 265, 359/270, 275; 427/58

[56] References Cited

U.S. PATENT DOCUMENTS

| 3,674,342 | 7/1972 | Castellano et al. | 349/141 |
|---|---|---|---|
| 3,807,831 | 4/1974 | Soref | 349/141 |
| 3,978,007 | 8/1976 | Giglia et al. | 252/506 |

(List continued on next page.)

FOREIGN PATENT DOCUMENTS

| 966923 | 4/1975 | Canada . |
|---|---|---|
| 1154135 | 6/1983 | Canada . |
| 0193978 | 9/1986 | European Pat. Off. . |
| 0333700 | 9/1989 | European Pat. Off. . |
| 0341554 | 11/1989 | European Pat. Off. . |
| 0 359 569 | 3/1990 | European Pat. Off. . |
| 0403180 | 12/1990 | European Pat. Off. . |
| 0486387 | 5/1992 | European Pat. Off. . |
| 3810923 | 10/1988 | Germany . |
| 41 03 231 | 8/1992 | Germany . |
| 59-113422 | 6/1984 | Japan . |
| 0226064 | 12/1984 | Japan . |
| 0099174 | 6/1985 | Japan . |
| 61-185730 | 8/1985 | Japan . |

(List continued on next page.)

OTHER PUBLICATIONS

Nomura, J. of Macromol. Sci–Chem., vol. 26, No. 1, 1989, "Electrochemical and Electrochromic Properties of Polymer Complex Films Composed of Polytetramethyleneviologen and Poly-[p-Styrenesulfonic Acid] Containing a Conductive Powder".

Masumi, Proc. of SID 1982, vol. 23/4, "Response–Improved Electrochromic Display Based on Organic Materials".

Kenji Nomura et al., "Electrochemical and Electrochromic Properties of Polymer Complex Films Composed of Polytetramethyleneiologen and Poly–(p–styrenesulfonic Acid) Containing a Conductivve Power". J. Macromol. Sci–Chem., A26 (2 & 3), pp. 593–608 (1989).

Primary Examiner—Tae Yoon
Attorney, Agent, or Firm—Howell & Haferkamp, L.C.

[57] ABSTRACT

Dispersions of electrically conductive particles useful for preparing electrically conductive, essentially ionically isolative composite layers having electrically conductive particles dispersed in a polymer matrix. Composite layers can be used in laminates for electrochromic displays where an ionically conductive layer is in contact with electrochromic material. Such displays comprise means for applying an electrical potential across the interface of the ionically conductive layer and the electrochromic material to generate an electrochromic effect at the interface. Electrochromic materials can be provided in the laminates as layers between the ionically conductive layer and the composite layer of electrically conductive particles dispersed in a polymer matrix. Alternatively, the electrochromic material can be incorporated in the conductive particles in the polymer matrix, e.g. as titanium dioxide coated with antimony tin oxide coated with polyaniline dispersed in an light transmitting polymer matrix. The materials of this invention allow for the high speed fabrication of flexible displays, e.g. by printing methods.

2 Claims, 1 Drawing Sheet

U.S. PATENT DOCUMENTS

| | | | |
|---|---|---|---|
| 3,981,559 | 9/1976 | Channin | 349/33 |
| 4,116,544 | 9/1978 | Soref | 349/141 |
| 4,345,249 | 8/1982 | Togashi | 345/103 |
| 4,416,516 | 11/1983 | Beni et al. | 350/357 |
| 4,465,339 | 8/1984 | Baucke et al. | 359/274 |
| 4,550,982 | 11/1985 | Hirai | 350/357 |
| 4,652,090 | 3/1987 | Uchikawa et al. | 359/267 |
| 4,750,817 | 6/1988 | Sammells | 360/357 |
| 4,810,067 | 3/1989 | Demiryont | 350/357 |
| 4,824,221 | 4/1989 | Endo et al. | 350/357 |
| 4,902,110 | 2/1990 | Green | 350/357 |
| 4,966,675 | 10/1990 | Steininger | 350/537 |
| 5,011,582 | 4/1991 | Oshikawa et al. | 359/267 |
| 5,078,480 | 1/1992 | Warszawski | 359/265 |
| 5,104,583 | 4/1992 | Richardson | 252/518 |
| 5,189,549 | 2/1993 | Leventis et al. | 359/271 |
| 5,216,536 | 6/1993 | Agrawal et al. | 359/274 |
| 5,227,252 | 7/1993 | Murayama et al. | 428/690 |
| 5,442,478 | 8/1995 | Lampert et al. | 359/273 |
| 5,500,759 | 3/1996 | Coleman | 359/265 |
| 5,548,421 | 8/1996 | Miyazaki | 359/54 |
| 5,576,867 | 11/1996 | Baur et al. | 359/87 |
| 5,600,464 | 2/1997 | Ohe et al. | 345/123 |

FOREIGN PATENT DOCUMENTS

| | | |
|---|---|---|
| 0181172 | 9/1985 | Japan . |
| 0229964 | 11/1985 | Japan . |
| 61-1185730 | 8/1986 | Japan . |
| 62-044719 | 2/1987 | Japan . |
| 62-049333 | 3/1987 | Japan . |
| 63-207856 | 8/1988 | Japan . |
| 3275658 | 11/1988 | Japan . |
| 1107135 | 4/1989 | Japan . |
| 6 183 708 | 7/1994 | Japan . |
| WP 87/01515 | 3/1987 | WIPO . |
| WO92/18896 | 10/1992 | WIPO . |
| WO92/19694 | 11/1992 | WIPO . |
| WO93/21557 | 10/1993 | WIPO . |
| WO93/21558 | 10/1993 | WIPO . |
| WO93/22707 | 11/1993 | WIPO . |
| WO9606437 | 2/1996 | WIPO . |

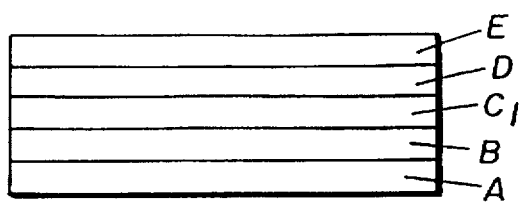
FIG. 1.
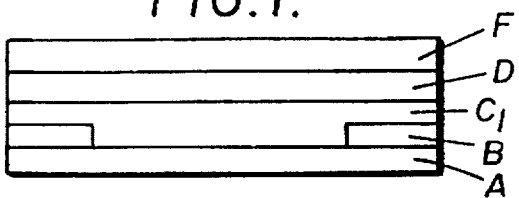
FIG. 2.
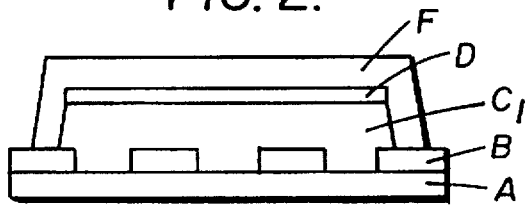
FIG. 3.
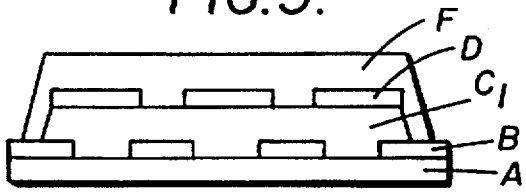
FIG. 4.
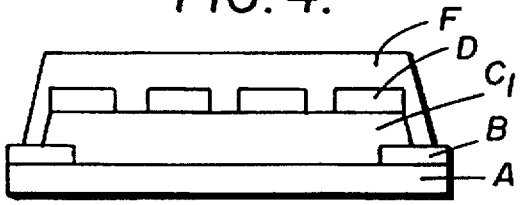
FIG. 5.
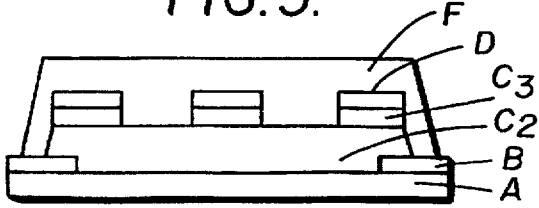
FIG. 6.
LESS FILLING
TASTES GREAT
FIG. 7.

ELECTROCHROMIC MATERIALS AND DISPLAYS

This application is a continuation of application Ser. No. 08/435,595 filed on May 5, 1995 now abandoned which is a division of application Ser. No. 07/994,813, filed Dec. 22, 1992, now U.S. Pat. No. 5,413,739.

Disclosed herein are electrochromic materials, useful for fabricating electrochromic laminates which are adaptable for electrochromically-functional image displays.

BACKGROUND OF THE INVENTION

Japanese Patent Kokai 61-185,730 discloses composite films of electrochromic materials such as polyviologen which are bonded to the surface of electrically conductive particles such as tin oxide by using cyanuric chloride. Electrochromic displays are produced by coating a transparent electrode (e.g. tin oxide) with a mixture of the composite material dispersed in a solution containing a polymer complex such as a polyionic complex of a macromolecular viologen with macromolecular sulfonic acid. An aqueous solution of sodium sulfate in contact with, the composite provides an electrochromic display element. Color changes with the application of voltage are visible through the transparent electrode. The element uses an ionically conducting electrochromic layer and requires the use of a transparent electrode to view the color change.

Japanese Patent Kokai 59-113,422 discloses a solid electrochromic display comprising a transparent substrate with a transparent electrode coating, an electrochromic layer and another electrode. For example, an electrochromic layer was cast onto a transparent indium tin oxide electrode from a solution of a tetrathiafulvavene, polymethacrylonitrile and lithium perchlorate (ion-acceptor); the other electrode was vacuum deposited metal. Response time for various displays was 2–5 seconds and the cell requires the use of a transparent electrode to view the color change.

Japanese Patent Kokai 63-207,856 discloses a macromolecular display material comprising a composite of a transparent resin such as PVC and an electrically conductive polymer such as polypyrrole or polythiophene containing an electrochromic macromolecule such as tungstic acid or sulfonic acid. Such composite materials coated on conductive, tin-oxide-coated glass provide display materials when immersed in an acetonitrile solution. This cell produced marginal color contrast from grey to dark blue.

Japanese Patent Kokai 01-107,135 discloses blends of electrochromic viologen derivatives with polymers to provide a polymeric film or sheet that can be useful in the manufacture of an oxygen sensor. The reduced viologen derivative dispersed in a polymer matrix changes color readily on contact with oxygen. Reversible color change requires extensive treatment to reduce the electrochromic material.

European Patent Publication 193,978 discloses a process for the uniform incorporation of powders into polymer layers which are useful in electrochromic instruments.

U.S. Pat. No. 4,810,067 discloses an electrochromic device in which an electrochromic layer is positioned between two electrodes. The electrochromic layer is positioned between two electrodes and comprises an organic material which has been polymerized and condensed supporting electrochromic particles and ion producing particles.

U.S. Pat. No. 4,550,982 discloses an all solid state organic electrochromic display device which comprises a polymer layer comprising at least one organic electrochromic material and at least one ionic material.

European Patent Publication 0 403 180 (Cookson Group, PLC) discloses powdery or granular material coated with inherently conductive polymer, e.g. polyaniline or polypyrrole, for use in an EMI or RFI shielding material for compounding into polymer.

Nomura et al. in Journal of Macromolecular Science—Chemistry, A26(2&3), pages 593–608 (1989) disclose electrochemical and electrochromic properties of polymer complex films composed of polytetraamethyleneviologen and poly(p-styrenesulfonic acid) containing a conductive powder.

SUMMARY OF THE INVENTION

This invention provides dispersions of electrically conductive particles useful for preparing electrically conductive, essentially ionically isolative composite layers having electrically conductive particles dispersed in a polymer matrix. Such composite layers are useful for composite coatings on electrodes for electrochemical applications. Alternatively, such composite layers can be used in laminates which are useful as electrochromic displays where an ionically conductive layer is in contact with electrochromic material. Such displays comprise means for applying an electrical potential across the interface of the ionically conductive layer and the electrochromic material to generate an electrochromic effect at the interface. Electrochromic materials can be provided in the laminates as layers between the ionically conductive layer and the composite layer of electrically conductive particles dispersed in a polymer matrix or dissolved or dispersed in the ionically conductive layer. Alternatively, the electrochromic material can be incorporated in the conductive particles in the polymer matrix. In preferred aspects of this invention the polymer matrix and the ionically conductive layers transmit visible light to allow visual observation of electrochromic effects. The materials of this invention allow for the high speed fabrication of flexible displays, e.g. by printing methods.

BRIEF DESCRIPTION OF THE DRAWINGS

FIGS. 1–6 are partial side views of laminates useful as electrochromic displays.

FIG. 7 is a view of an electrode pattern for an electrochromic display.

DETAILED DESCRIPTION OF PREFERRED EMBODIMENTS

As used herein the term "electrochromic" refers to a material which changes color when subjected to an electrochemical potential. Such electrochromic materials are known in the art and include polyaniline, polypyrrole, polythiophene, nickel oxide, polyvinylferrocene, polyviologen, tungsten oxide, iridium oxide, molybdenum oxide and Prussian blue (ferricferrocyanide).

As used herein the term "electrically conductive" refers to a material which conducts electricity including metals such as copper, nickel and aluminum, metal oxides such as tin oxide, indium-doped tin oxide (ITO) and antimony-doped tin oxide (ATO), metal flake in a polymer or resin such as silver flake ink, carbon such as graphite or lampblack, and conductive polymers such as polyaniline and polypyrrole. Such electrically conductive materials are useful as electrodes in electrochromic displays. When electrically conductive materials are used as electrodes, e.g. in displays or other devices, electrochromic materials in contact with conductors, such as metals, can be electrochemically active, e.g. polyaniline can oxidize copper electrodes. Thus, where extended life is desired, an electrically conductive material should be selected to minimize electrochemical instability arising from contact with electrochromic materials and electrolyte.

This invention provides dispersions of electrically conductive particles in (i) a melt processable polymer, (ii) polymerizable monomer or oligomer, or (iii) a liquid containing dissolved or dispersed melt processable polymer, polymerizable monomer or oligomer. The electrically conductive particles consist of (a) an electrically conductive core coated with an electrochromic material, (b) an electrochromic material core and an electrically conductive coating, (c) electrically conductive electrochromic material, (d) agglomerations of electrochromic material and electrically conductive material or (e) electrically conductive material. Dispersions of electrically conductive particles, preferably electrochromic particles, in a melt processable polymer matrix are useful for providing thermoplastic composite films. Dispersions of electrically conductive particles, preferably electrochromic particles in polymerizable monomer or oligomer, are useful for casting films of a thermoset or crosslinked polymer matrix having electrically conductive particles dispersed therein. Dispersions of electrically conductive particles in a liquid containing dissolved or dispersed melt processable polymer, polymerizable monomer or oligomer are useful as inks for printing patterns of composite having electrically conductive particles dispersed in a polymer matrix. When the dispersed particles comprise electrochromic material, such composite films can be used as in laminates, e.g. with electrodes printed on one side and an ionically conductive layer applied to the other, to provide electrochromic displays. Alternatively, electrochromic material can be applied as a separate layer in the laminate between the composite layer and the ionically conductive layer or the electrochromic material can be dissolved or dispersed in the ionically conductive layer.

A preferred aspect of this invention provides inks, adaptable to a variety of printing methods, comprising an emulsion or solution of polymer having electrically conductive, preferably also electrochromic, particles dispersed therein. Preferred particles are (a) particles comprising electrically conductive material, e.g. titanium dioxide particles coated with electrically conductive ITO or ATO (b) particles comprising electrically conductive material, such as metal, metal oxide or carbon, coated with an electrochromic material, e.g. titanium dioxide particles coated with electrically conductive ITO or ATO which is coated with electrochromic polyaniline, (c) particles comprising electrochromic material at least partially coated with an electrically conductive material, e.g. polyaniline coated with ITO, (d) particles of electrically conductive electrochromic material, e.g. polyaniline, or (e) agglomerations of electrochromic material and electrically conductive material, e.g. agglomerated particles of polyaniline and ITO.

In the laminates of this invention the electrically conductive particles are provided in a composite with a polymer matrix. In the case of visual displays it is generally preferred that the polymer matrix transmit visible light, i.e. be transparent or translucent to the visible light spectrum, more preferably be optically clear. The particles can be dispersed in the polymer by a variety of methods. For instance, particles can be dispersed in molten polymer or in solutions of polymer, e.g. toluene solutions of polybutadiene or aqueous emulsions of polyvinyl chloride, by homogenization blending. While the polymer can be thermoset, thermoplastic or elastomeric, in many cases it is preferred that the polymer be optically transparent or translucent, more preferably optically clear, thermoplastic polymer. Useful thermoplastic polymers include polystyrene, polyacrylates, polymethacrylates such as polymethylmethacrylate, polyurethanes, polyolefins such as high or low density polyethylene, linear low density polyethylene and polypropylene, polyesters such as polyethylene terephthalate (PET), polyamides such as nylon-6 and nylon-6,6, polycarbonate, polyvinylchloride (PVC), polyvinylacetal such as polyvinylbutyral, polyvinyl esters such as polyvinylacetate, polyvinyl alcohol, copolymers such as ethylene vinylacetate copolymer, styrene-acrylonitrile copolymer and styrene maleic anhydride copolymer, graft copolymers such as ABS, and blends thereof. Useful thermoset polymers include epoxy resins, polyester resins, phenol formaldehyde reins and bismaleimide reins. Useful elastomers include acrylic rubber such as polybutylacrylate, olefin rubber such as polybutadiene, EPDM rubber, EP rubber, styrene butadiene rubber and nitrile rubber, and thermoplastic elastomers such as styrene-butadiene block copolymers and blends of polypropylene and EPDM. The above polymers and other polymers useful in this invention are chosen for use in this invention because they do not conduct ions. It is not known whether all of the above-described polymers absolutely do not transmit ions, e.g. at some de minimus level. In this regard it is expected that there is a threshold ion transmission level that can be tolerated. Regardless the above polymers and other useful un-named polymers are characterized as essentially ionically isolative. The polymer melt or solution containing dispersed electroconductive particles can be applied as a coating by conventional and well-known methods. Preferably, the polymer is applied as a thin coating, e.g. about 1–25 micrometer thick, which forms a polymeric film, e.g. on solidification of the melt or evaporation of solvent. The polymeric film is disposed as a polymer matrix having dispersed therein electroconductive particles at sufficiently high density as to provide a moderate electrical resistance, e.g. on the order of 100 ohms to 1,000 ohms, so that the composite polymer layer is electrically conductive.

In the laminates of this invention a composite polymeric film is applied over one or more electrodes, e.g. an electrode pattern of metal, metal oxide, carbon, intrinsically conductive polymer or polymer composite having an electrical resistance substantially lower than the electrical resistance of the composite material of dispersed particles in a polymer matrix. When the composite polymer material is electrochromic, the material can be applied in a pattern covering the electrodes or in an occluding layer over the electrode pattern area. In another aspect of this invention, when the composite polymer material does not contain electrochromic material, laminates can be provided by applying one or more layers of electrochromic material on the composite polymer layer, e.g. over the entire composite area or in register over the electrode pattern. Where the composite layer has an electrical conductivity less than the conductivity of the overlying ionically conductive layer, electrodes can be applied in a side-by-side manner on the same of the composite layer opposite the ionically conductive layer. Alternatively, electrodes can be applied to laminates in a sandwich like fashion, with one electrodes at one potential on one side of the laminate in contact with the composite layer and transparent electrodes, e.g. of metal oxide such as ITO, of a different potential applied to the other side of the laminate in contact with the ionically conductive layer.

In the laminates and electrochromic displays of this invention ionically conductive layers comprise aqueous or organic solvent-containing polymeric gel. Such ionically conductive layers are in contact with electrochromic material to provide an interface for generating electrochromic effects. Such ionically conductive layer preferably comprises an aqueous polymeric gel which can contain a humectant or hygroscopic filler. Useful hygroscopic material includes deliquescent material such as lithium chloride, calcium chloride, glycerine, sodium dihydrogen phosphate or lithium trifluoromethylsulfonate. A preferred aqueous polymeric gel is polyacrylamidomethylpropanesulfonate, known as POLYAMPS. In certain of the laminates of this invention the ionically conductive layer is coated with a non-conducting, preferably light transmitting, barrier layer to maintain the gel like character of the layer. In other cases the ionically conductive layer is optionally coated with a light transmitting electrode material, e.g. ITO, in a pattern or a film.

In the laminates of this invention described above, the interface between the ionically conductive layer and the electrochromic material is electrochromically activatable when an electric potential is applied across said interface. For instance, the electrical resistance of a thin electrochromic composite layer is sufficiently high that side by side electrodes at a differential voltage can be used under the laminate without excessive short circuit current between side by side electrodes. That is, the path of least resistance is from one electrode through the electrochromic composite layer to an ionically conductive gel layer back through the electrochromic composite layer to the other electrode. The electrochromic effect is observed at the interface between the electrochromic composite layer and the ionically conductive layer. A transfer of electrons to the electrochromic particles requires ion transfer to or from the electrochromic material. Because the matrix polymer of the composite is essentially ionically non-conductive, ion transfer from the ionically conductive layer to electrochromic material occurs at the interface between layers and not substantially at the underlying electrode structure. The mobility of ions to or from electrochromic material at the interface allows electron transfer to the mobile ion-receptive electrochromic material at the interface. A change in the electron oxidation state of the electrochromic material results in a change in color in the material at the interface. By arranging electrode in patterns, a variety of images can be generated by the electrochromic effect. In certain preferred aspects of this invention the electrochromic image is erasable by removal or reversal of the electrical potential that created said image.

In view of the above description one aspect of this invention provides electrochromic displays comprising:

(a) at least one electrode, e.g. applied to a nonconductive flexible substrate, and (b) an electrically conductive, essentially ionically isolative composite layer in contact with said electrode, where the layer comprises a dispersion of electrochromic particles in a visible light transmitting polymer matrix, and (c) a visible light transmitting, ionically conductive layer coated onto the composite layer. The interface between the layers is electrochromically activatable when an electric potential is applied across the interface.

With reference to FIGS. 1–6 there is illustrated a variety of laminate electrochromic displays made possible by this invention. These laminates comprise a substrate A, e.g. a nonconductive layer of polyethylene terephthalate (PET) film, coated with a conductive layer B of one or more electrodes, e.g. metal, metal oxide, conductive polymer or carbon. Layer $C_1$ is an electrically conductive, essentially ionically isolative, electrochromic composite layer comprising a dispersion of electrically conductive, electrochromic particles dispersed in a polymer matrix, e.g. titanium dioxide particles coated with ATO and polyaniline dispersed in a rubber matrix. Layer $C_2$ is an electrically conductive, essentially ionically isolative composite layer comprising a dispersion of electrically conductive, (non-electrochromic) particles dispersed in a polymer matrix, e.g. titanium dioxide particles coated with ATO dispersed in a rubber matrix. Layer $C_3$ is a layer of electrochromic material, e.g. polyaniline. Layer D is an ionically conductive layer, e.g. POLYAMPS gel. Transparent conductor layer E, e.g. an ITO coated film, can serve as an electrode and transparent, insulating layer F, e.g. a PET film can serve as a provide to loss of electrolyte from the conductive layer. With reference to FIG. 1, an electric potential between electrodes B and E will create an electrochromic effect at the interface of layers $C_1$ and D. FIG. 2 illustrates a display having side-by-side electrodes B, on substrate A. Because the conductivity of the electrochromic composite layer $C_1$ is lower than the conductivity of the ionically conductive layer D, current will preferentially flow from one electrode through the electrochromic composite layer to the ionically conductive layer to the area above the next electrode where it will pass in a reverse direction through the electrochromic layer to the second electrode. Where the electrochromic material changes color with the loss of an anion, the electrochromic effect will be visible over one electrode. Where the electrochromic material changes color with both the gain and loss of an anion, e.g. as in the case of polyaniline, electrochromic effects will be visible over both electrodes.

FIGS. 3, 4, 5 and 6 illustrate bipolar electrodes. In FIGS. 3 and 4, an electrical potential difference across the outer electrodes will generate bipolar potential differences at different halves of the intermediate electrodes so as to create opposite electrochromic effects in the interface of layers $C_1$ and D over the bipolar charged ends of each intermediate electrode. In FIG. 5, the opposite electrochromic effects are created at the interface between layers $C_1$ and D under the edges of the segmented electrolyte layer D. In FIG. 6, the opposite electrochromic effects are created at edges of segmented sections creating the interface of electrochromic layer $C_3$ and the ionically conductive layer D.

A preferred application for non-electrochromic composites, e.g. ATO/titanium dioxide in a polymer matrix, is for electrode coatings for electrochemical processing. For instance, an electrode comprising a copper substrate coated with a non-electrochromic composite of this invention exhibits a resistance to electrochemical redox attack similar to the electrochemical redox resistance of a platinum electrode, e.g. for voltammetric applications.

While the following examples illustrate the use of various materials in embodiments of the electrochromic inks, composites, laminates and displays and methods of this invention, it should be clear from the variety of species discussed herein that there is no intention of so limiting the scope of the invention. On the contrary, it is intended that the breadth of the invention illustrated by reference to the following examples will applies to other embodiments which would be obvious to practitioners in the electrochromic arts.

EXAMPLE 1

This example illustrates embodiments of this invention employing polyaniline as an electrochromic material. Electrochromic particles were prepared using ATO coated titanium oxide particles (0.2) micrometer in diameter obtained from Mitsubishi Materials Company Ltd as W-1 conducting particles. 10 g of the conducting particles were dispersed in 30 ml dilute hydrochloric acid (about 4%), in an ice bath, followed by the addition of 1 g aniline and 1.15 g ammonium persulfate (in 20 ml water) to initiate polymerization of the aniline on the ATO surface of the particles. After polymerization the solution was filtered, washed and dried providing pale green electrochromic particles, i.e. particles with an electrically conductive core (ATO on titanium dioxide) coated with an electrochromic material (polyaniline). 3 g of the electrochromic particles were dispersed with homogenization into a 10 g solution of toluene containing 3 g styrene-butadiene rubber (SBR) to provide an electrochromic ink. A multiple electrode pattern comprising silver flake conductive ink was printed onto a PET substrate. The electrode pattern was coated with a thin film of the electrochromic ink. After the electrochromic ink was allowed to dry to form a green, electrochromic composite polymer film, a layer of ionically conductive gel (i.e. POLYAMPS) was applied. The gel was covered with a second layer of PET. When any two electrodes in the pattern were subjected to a differential voltage (e.g. in the range of 0.5 to 3 volts), the electrochromic material at the interface over the more electronegative electrode (the cathode) was reduced, changing the color at the interface over the cathode to a light white color. Simultaneously, the electrochromic material at the interface over the more electropositive electrode (the anode) was oxidized, changing the color at the interface over the anode to a dark blue color.

EXAMPLE 2

Electrochromic particles were prepared in the manner of Example 1 employing polypyrrole in place of polyaniline. The particles were employed in electrochromic displays Example 1, the polypyrrole changing reversibly from blue-black at the anode to light grey-brown at the cathode.

EXAMPLE 3

Electrochromic particles were prepared having a tungsten oxide electrochromic material coating over ATO/titanium dioxide conducting particles. When used in displays as in Example 1, the normally white composite layer changed reversibly to a blue color at the interface over the cathode.

EXAMPLE 4

Electrochromic particles were prepared having Prussian Blue electrochromic material coating over ATO/titanium dioxide conducting particles; the Prussian Blue material was prepared from a mixture of ferric chloride, potassium ferricyanide and potassium chloride in water. When used in displays as in Example 1, the normally light blue composite layer changed to a white color at the interface over the cathode.

EXAMPLE 5

Electrochromic particles were prepared by coating poly (p-xylylviologen) poly(styrenesulfonate) over ATO/titanium dioxide conducting particles. 10 g of conducting particles was mixed with a solution of 1 g of the polyviologen in a mixture of 24 ml of dioxane and 24 ml of concentrated HCl; the solution was dried to a powder which was ground and mixed at 3:1 with SBR (10% in toluene), providing a suspension of electrochromic particles. The solution coated onto copper electrodes, dried and immersed in an aqueous, electrolyte solution of sodium sulfate; application of electric potential resulting in electrochromic switching between purple (cathode) and white (anode).

EXAMPLE 6

1.5 g of conductive powder (ATO on titanium dioxide) was dispersed in 5 g of a toluene solution containing 10wt % SBR. A 0.15 mm thick film of the dispersion coated on glass exhibited a resistance of about 10 ohms across the thickness of the film. A PET film coated with copper was coated with the dispersion; after drying the dispersion, the laminate with a conductive composite film was immersed in 80 ml of a solution of 1 ml aniline in dilute sulfuric acid. With the application of 1–2 volts a deep blue layer of polyaniline was coated anodically onto the laminate, reversal of electrical polarity allowed the color to switch between deep blue and a yellow-green.

EXAMPLE 7

The procedure of Example 6 was repeated except the laminate with a conductive composite film was immersed in 80 ml of a solution of 1 ml pyrrole in dilute sodium chloride. A blue-black layer of polypyrrole was coated anodically onto the laminate, reversal of electrical polarity allowed the color to switch between blue-black and grey-brown.

EXAMPLE 8

With reference to drawings the pattern of FIG. 7 was silk screen printed using silver ink (Metech 2500M). The dried pattern was coated with a solution of 7 g toluene, 3 g of SBR having 3 g of dispersed particles of polyaniline/ATO/titanium dioxide. The dried composite layer was coated with POLYAMPS. A switching potential of ±1.5 volts DC applied to the electrodes caused alternate blue (anode) or white (cathode) lettering to appear in a light green field.

EXAMPLE 9

The procedure of Example 8 was repeated except the dried pattern was coated with a toluene solution of SBR having dispersed particles of polyviologen-polystyrene sulfonate/ATO/titanium dioxide. A reversible color change pattern was produced.

EXAMPLE 10

2 g of ATO/titanium oxide particles, 1 g of Versicon™ polyaniline (Allied-Signal) and 10 g of a toluene solution of SBR (1 g) was homogenized for one minute. 1.2 g of the homogenized dispersion was mixed with 1.2 g of a toluene solution of SBR (0.12 g) to provide a dispersion of agglomerates of conductive particles and electrochromic particles in an rubber solution. The dispersion was coated onto a PET film with copper electrodes. Application of a reversing 6 volt DC potential caused the coating over the electrodes to change between grey and blue.

EXAMPLE 11

The procedure of Example 10 was repeated except that conductive particles of ATO/titanium dioxide were omitted. The application of a 1.5 volt DC electric field produced no discernible electrochromic effect.

EXAMPLE 12

With reference to FIGS. 3, a bipolar electrochromic display was produced by coating an electrode layer pattern from silver ink on PET film. The dried electrodes was coated with an electrochromic ink of a dispersion of polyaniline/ATO/titanium dioxide particles in a toluene solution of SBR. The dried composite layer was coated with POLYAMPS.

The application of a 0.4 volt DC electrical potential difference across the outer electrodes generated bipolar potential differences at different halves of the intermediate electrodes so as to create blue and light green electrochromic effects on the halves of the interface over the central electrodes.

EXAMPLE 13

The procedure of Example 10 was essentially repeated except the electrochromic dispersion was prepared from conductive particles of tungsten oxide/ATO/titanium dioxide dispersed in a toluene solution of SBR. A reversible electrochromic blue image was displayed with the alternating application of 1.5 volts DC.

EXAMPLE 14

Polyaniline solution was coated onto a PET film and dried to provide a conductive coating with a resistivity of about 100 ohms/square. A thin scratch of the conductive coating was removed to provide two contiguous electrodes which were coated with an electrochromic ink containing polyaniline/ATO/titanium dioxide dispersed in a toluene solution of SBR. The ink was dried to provide a composite coating which was coated with POLYAMPS. The alternating application of 1.5 volts DC to the electrodes caused a color change between dark blue and very pale green (almost white).

EXAMPLE 15

The procedure of Example 14 was repeated without the electrochromic composite layer; that is, POLYAMPS was coated directed onto the polyaniline electrodes. The application of 3 volts DC caused the anode to slowly darken from a blue-green to a deeper blue-green and the cathode to lighten to a yellow-green. There was a long (several minutes) delay for color change on reversal of voltage.

EXAMPLE 16

1 g of polyaniline was mixed with 10 g of a toluene solution of SBR (1 g) in a homogenizer for 1 minute. The dispersion was coated over electrodes printed on a PET film, dried and overcoated with POLYAMPS, providing a black colored laminate. A weak electrochromic effect was observed with the application of ±1.5 volts DC; with 3–5 minutes of applied voltage slight lightening of the black color would be observed over the cathode, with no change observable over the anode.

3.4 g of the dispersion was blended with 0.24 g of titanium dioxide, providing a dark grey dispersion which was used to prepare a laminate having a dark grey color. With the application of 1.5 volts DC the cathode lightened to a yellowish grey and the anode darkened. With voltage reversal colors changed in 15–20 seconds.

EXAMPLE 17

An electrochromic solution was prepared by mixing 0.1 g of lithium bromide in 5 ml of a saturated, aqueous solution of bismuth nitrate. The solution was coated onto a laminate comprising a PET film substrate, silver electrodes and a layer of ATO/titanium dioxide dispersed in SBR. With the application of 1.5 volts DC the cathode turned dark grey and slowly faded on removal of the electric field.

EXAMPLE 18

An electrochromic dispersion was prepared by homogenizing 2 g of polyaniline/ATO/titanium dioxide particles in an emulsion of 2.4 g polyvinylchloride (PVC) and 12 g water. The viscous emulsion was coated onto silver electrodes on a PET film, dried and coated with POLYAMPS, providing a laminate that exhibited color change with the application of 1.5 volts DC.

EXAMPLE 19

The procedure of Example 1 was essentially repeated except the electrodes on the PET film were (a) silver coated with a carbon (Metech 2513) (b) aluminum foil, (c) carbon or (d) polyaniline. The silver/carbon and aluminum foil electrodes provided rapid electrochromic display at 1.5 volts DC; the carbon electrodes, at 3 volts DC; and the polyaniline electrodes, at 10 volts DC.

EXAMPLE 20

An electrochromic dispersion prepared by homogenizing 3 g of polyaniline/ATO/titanium dioxide in 10 g of a toluene solution of SBR (3 g) was coated over two silver/carbon electrodes on PET film, dried for 2 minutes at 110° C., coated with a 10% aqueous solution of POLYAMPS and covered with a PET film. The electrodes were connected to a function generator supplying ±1.5 volt square waves. At 20 Hertz a flashing electrochromic color change was clearly visible with lightening of color as the primary perceived effect. At lower frequencies alternative darkening to a deep blue could also be perceived. The laminate displayed an electrochromic effect for more than 4 million cycles.

EXAMPLE 21

With reference to FIG. 6, an bipolar electrochromic display was constructed by coating two silver electrodes about 40 mm apart on a PET film. The area between the electrodes was coated with a layer of ATO/titanium dioxide dispersed in SBR. Three electrochromic areas were provided between the electrodes by applying area coatings of polyaniline/ATO/titanium dioxide; the electrochromic areas were coated with POLYAMPS. Application of 10 volts DC across the silver electrodes caused the edges of the polyaniline-containing areas to exhibit a bipolar electrochromic effect—color change was blue toward one electrode and white toward the other electrode.

While specific embodiments have been described herein, it should be apparent to those skilled in the art that various modifications thereof can be made without departing from the true spirit and scope of the invention. Accordingly, it is intended that the following claims cover all such modifications within the full inventive concept.

What is claimed is:

1. A method for fabricating flexible electrochromic displays comprising:
    (a) forming electrodes in a pattern on a flexible substrate,
    (b) coating said electrodes with electrically conductive, essentially ionically isolative material in a layer comprising one or more areas wherein said ionically isolative layer comprises a transparent or translucent matrix having dispersed electroconductive particles comprising mineral particles coated with electrically conductive metal oxide and an electrochromic material, and
    (c) providing an interface by applying a layer of ionically conductive material, whereby when an electrical potential is applied across the interface, an electrochromic effect is generated.

2. A method according to claim 1 wherein said electroconductive particles comprise titanium dioxide particles coated with electrically conductive doped tin oxide and electrochromic material.

* * * * *